US006865404B1

United States Patent
Tikkala et al.

(10) Patent No.: US 6,865,404 B1
(45) Date of Patent: Mar. 8, 2005

(54) HANDSET

(75) Inventors: Päivi Tikkala, Oulunsalo (FI); Mikko With, Oulunsalo (FI); Christian Kraft, Copenhagen (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/510,517

(22) Filed: Feb. 22, 2000

(30) Foreign Application Priority Data

Feb. 22, 1999 (GB) .............................................. 9904055

(51) Int. Cl.[7] ................................................. H04Q 7/32
(52) U.S. Cl. .................... 455/566; 455/550.1; 345/660; 345/667; 345/788
(58) Field of Search .............................. 455/550.1, 566, 455/563, 575.1, 903, 556.1, 557, 344, 347, 422, 403, 556.2, 517; 345/660, 667, 788

(56) References Cited

U.S. PATENT DOCUMENTS

| 5,465,401 | A | * | 11/1995 | Thompson ................... 455/566 |
| 5,801,703 | A |   | 9/1998  | Bowden et al. |
| 5,936,545 | A |   | 8/1999  | Tsumura |
| 6,125,287 | A | * | 9/2000  | Cushman et al. ............ 455/566 |
| 6,243,080 | B1 | * | 6/2001  | Molne ......................... 455/90 |
| 6,298,230 | B1 | * | 10/2001 | Schneider-Hufschmidt .. 455/90 |
| 6,334,049 | B1 | * | 12/2001 | Nishiyama et al. ........... 455/90 |
| 6,381,474 | B1 | * | 4/2002  | Kraft .......................... 455/566 |
| 6,405,060 | B1 | * | 6/2002  | Schroeder et al. .......... 455/566 |

FOREIGN PATENT DOCUMENTS

| EP | 537097 A1 | 4/1993 |
| EP | 651543 A2 | 5/1995 |
| JP | 9-322214  | 12/1997 |

OTHER PUBLICATIONS

Nokia 9000i User's Manual, Jun. 1998.

* cited by examiner

*Primary Examiner*—William Trost
*Assistant Examiner*—Keith Ferguson
(74) *Attorney, Agent, or Firm*—Antonelli, Terry, Stout & Kraus, LLP

(57) ABSTRACT

A handset including a user interface having an input, a display for presenting an item, and a selection device coupled to the input for selecting an item presented on the display. The item may be presented in contracted format and/or expanded format.

12 Claims, 22 Drawing Sheets

THE CURRY HOUSE

| SET MENU | STARTERS | MAIN COURSE | SUNDRIES | SIDE DISHES |
|---|---|---|---|---|
| No OF PERSONS<br>1<br>2<br>3<br>4 | SAMOSA<br>PRAWN PUREE<br>ONION BHAJI | MEAT<br>CHICKEN TIKKA<br>LAMB MADRAS<br>CHICKEN VINDALOO | RICE<br>PLAIN<br>PILAU | BOMBAY POTATOES<br>ALOO GOBI |
| | | FISH<br>PRAWN BIRYANI<br>KING PRAWN JALFREZI | NAN<br>GARLIC<br>KEEMA | |
| | | VEGETABLE<br>DHANSAK<br>TIKKA MASALA | | |

FIG. 5(a)

| SET MENU |
|---|
| No OF PERSONS<br>1<br>2<br>3<br>4 |
| STARTERS |
| SAMOSA<br>PRAWN PUREE<br>ONION BHAJI |
| MAIN COURSE |
| MEAT<br>CHICKEN TIKKA<br>LAMB MADRAS<br>CHICKEN VINDALOO |
| FISH<br>PRAWN BIRYANI<br>KING PRAWN JALFREZI |
| VEGETABLE<br>DHANSAK<br>TIKKA MASALA |
| SUNDRIES |
| RICE<br>PLAIN<br>PILAU |
| NAN<br>GARLIC<br>KEEMA |
| SIDE DISHES |
| BOMBAY POTATOES<br>ALOO GOBI |

FIG. 5(b)

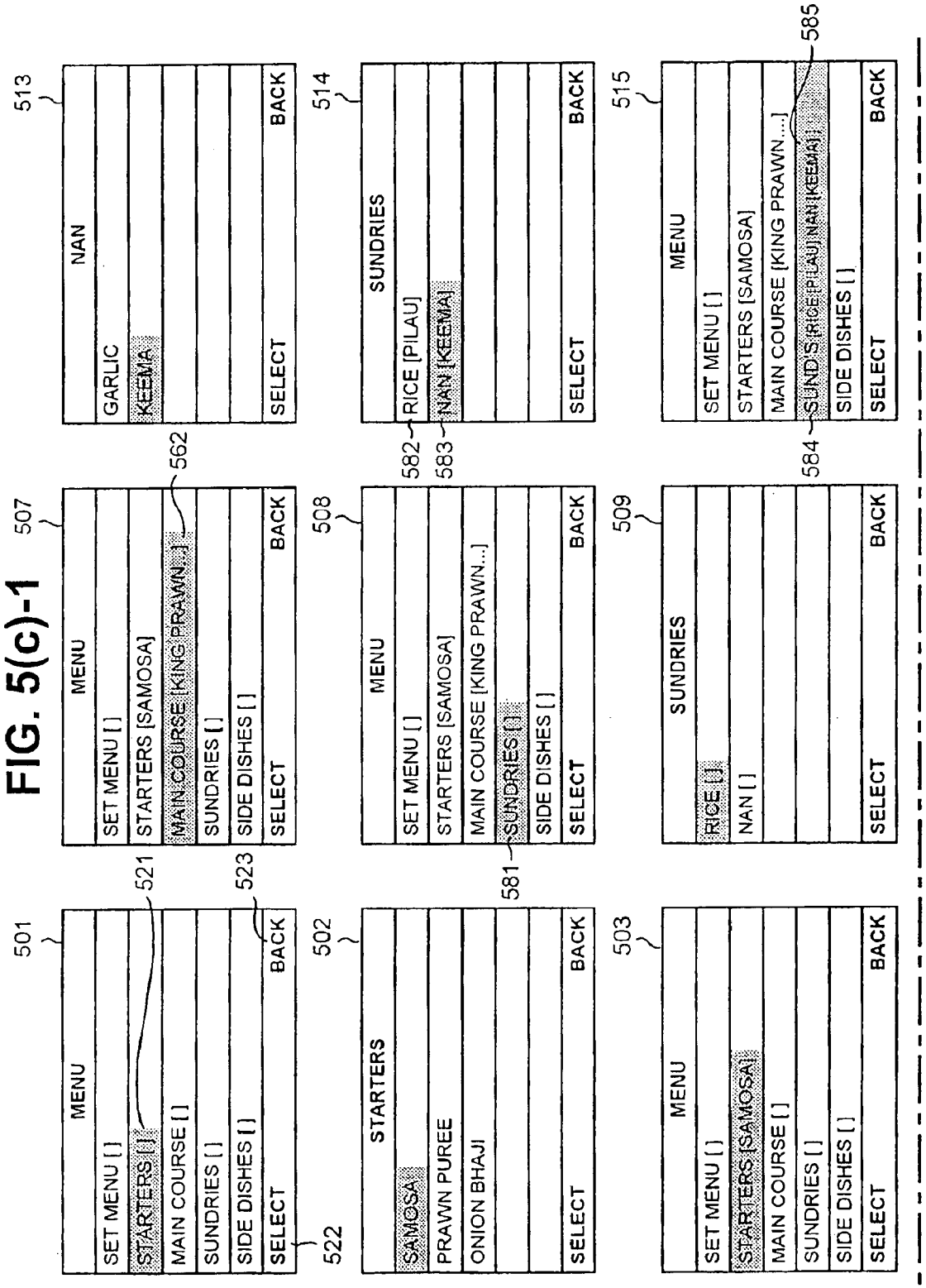

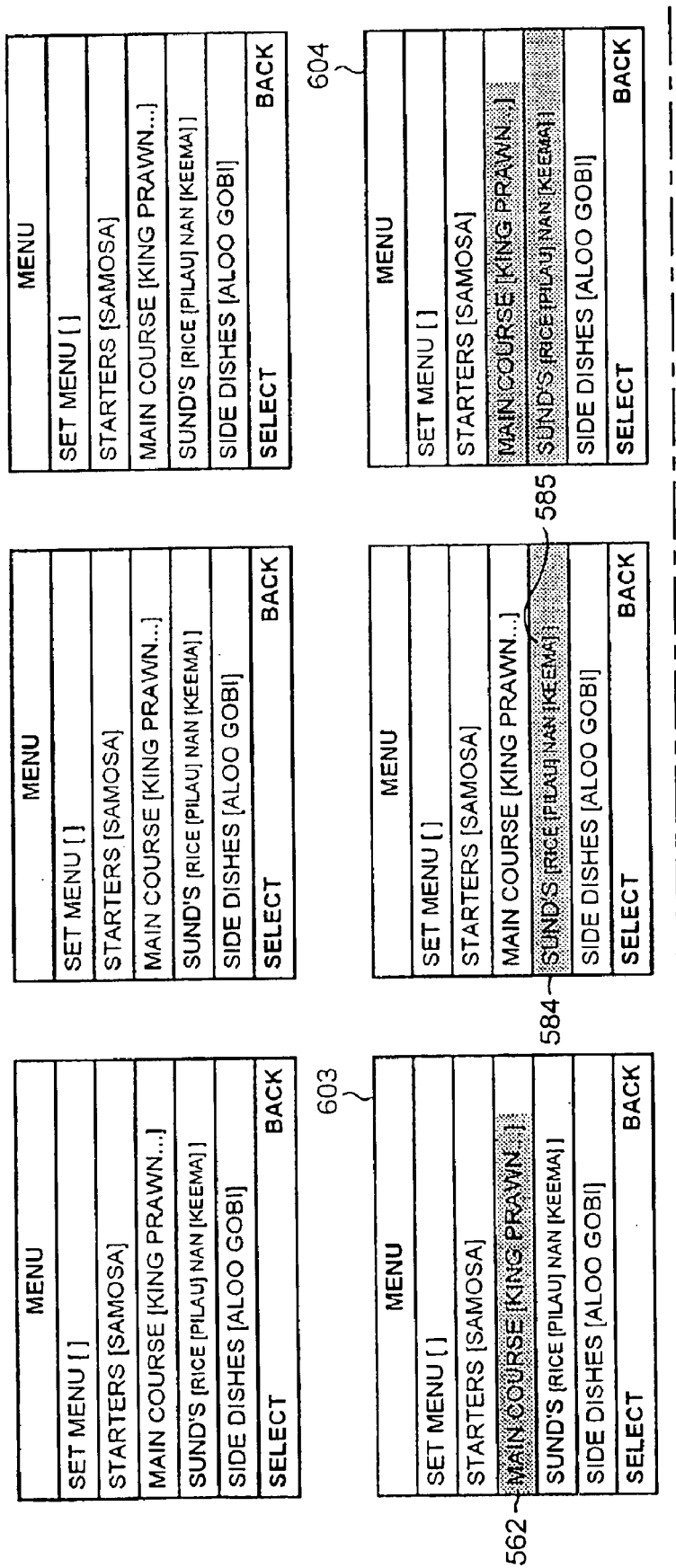

```
<CARD NAME="Info">
Please enter info:
First Name:<INPUT TYPE="TEXT" KEY="fname" TITLE="First name:"/>
Last Name:<INPUT TYPE="TEXT" KEY="lname" TITLE="Last name:"/>
<DO TYPE="ACCEPT" NAME="do1" LABEL="OK">
  <GO URL="#card"/>
</DO>
</CARD>
```
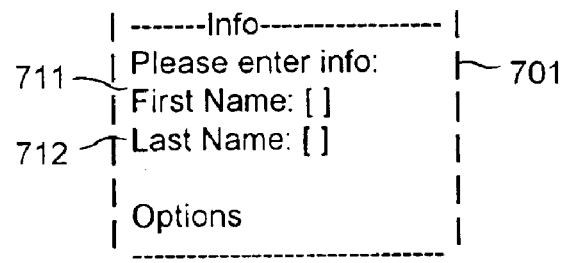
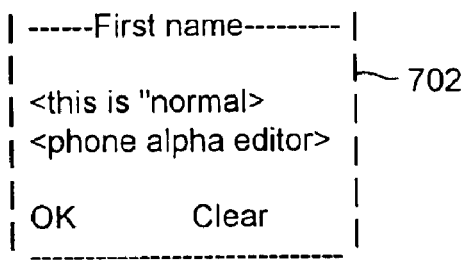
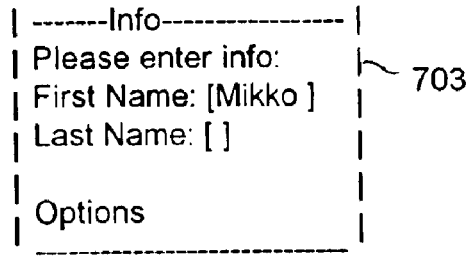
FIG. 7

```
<WML>

<CARD NAME="Sports" STYLE="LIST">
<DO TYPE="ACCEPT" LABEL="Back">
<GO URL="main.wml"/></DO>

-Sports Results-
Select the topic:
<SELECT TITLE="Game 8-Oct">
<OPTION ONCLICK="#Soccer">Soccer</OPTION>
<OPTION ONCLICK="#Hockey">Hockey</OPTION>
<OPTION ONCLICK="#Tennis">Tennis</OPTION>
</SELECT>
</CARD>
```

```
| ------Sports-------        |
|                            |
|   -Sports Results-         |
| Select the topic:[ ]       |
|                            |
| Options                    |
|----------------------------|
```

```
| ----Game 8-Oct----         |
| Soccer                     |
| Hockey                     |
| Tennis                     |
|                            |
| Select      Back           |
|----------------------------|
```

```
| ------Sports------         |
|                            |
| -Sports Results-           |
| Select the topic:          |
| [Tennis]                   |
| Options                    |
|----------------------------|
```

FIG. 8

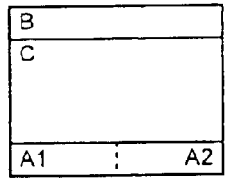
(a)
(d)
| | NAME | X | Y | W | H | LM | RM | TM | BM | J | CONTENTS |
|---|---|---|---|---|---|---|---|---|---|---|---|
| A1 | LEFT SOFTKEY | 0 | 54 | 96* | 11 | 0 | 0 | 3 | 0 | L | SOFTKEY TEXT |
| A2 | RIGHT SOFTKEY | 0* | 54 | 96* | 11 | 0 | 0 | 3 | 0 | R | SOFTKEY TEXT |
| B | HEADER | 0 | 0 | 0 | 0 | 0 | 0 | 0 | 0 | C* | GRAPHICAL ICONS AND / OR HEADER TEXT WITH LINE DRAWN ON BOTH SIDES |
| C | LIST OF ITEMS | 0 | 10 | 96 | 44 | | | | | | ITEM TEXT, IMAGES |
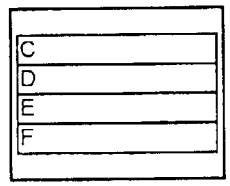
(b)
or
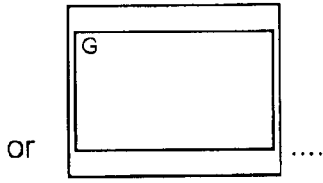
(c)
(e)
| | NAME | X | Y | W | H | LM | RM | TM | BM | J | CONTENTS |
|---|---|---|---|---|---|---|---|---|---|---|---|
| C | ITEM | 0 | 11 | 96 | 10 | 2 | 1 | 1 | 1 | L | ITEM TEXT |
| D | ITEM | 0* | 21 | 96 | 10 | 2 | 1 | 1 | 1 | L | ITEM TEXT |
| E | ITEM | 0 | 31 | 96 | 10 | 2 | 1 | 1 | 1 | L | ITEM TEXT |
| F | ITEM | 0* | 41 | 96 | 10 | 2 | 1 | 1 | 1 | L | ITEM TEXT |
| ! | PIXEL ROWS 10, 51, 52, 53 NOT IN USE | | | | | | | | | | |
| G | IMAGE | 0 | 10 | 96 | 44 | 2 | 1 | 0 | 1 | L | ITEM TEXT |
FIG. 11

THE CONTENT OF THE SERVICE COULD BE AS FOLLOWING:

WEATHER IN FINLAND
WEATHER IN POLAND
WEATHER IN UNITED STATES OF AMERICA

SELECT     BACK

WHAT WE CAN SHOW ON A SMALL DISPLAY IS:

WEATHER IN F...
WEATHER IN P...
WEATHER IN U...

SELECT     BACK

THE FOLLOWING METHOD SOLVES THE PROBLEM:

| 1. USER SCROLLS TO THE LAST ONE ROW CHOICE ITEM. | WEATHER IN F...<br>WEATHER IN P...<br>>WEATHER IN U...<br><br>SELECT     BACK |
|---|---|
| 2. AFTER A TIMEOUT THE *ONE ROW CHOICE ITEM* IS DISPLAYED AS *FULL WINDOW CHOICE ITEM*. ADDITIONALLY, THE LENGTHENING OF A ONE ROW CHOICE ITEM CAN ALSO BE DONE WITH A SPECIFIC SHORTCUT KEY e.g. #,*, etc. | WEATHER IN UNITED STATES OF AMERICA<br><br>SELECT     BACK |

SELECTION LIST. ">" CHARACTER IS USED TO REPRESENT THE ONE ROW CHOICE ITEM WHICH USER SELECTS.

HEADSET
  GENERAL
>SILENT

SELECT     BACK

MULTISELECTION LIST. "X" CHARACTER IS USED TO REPRESENT THE ONE ROW CHOICE ITEM WHICH USER HAS SELECTED.

X DOG
  CAT
X MOUSE

MARK     DONE

FIG. 14

HANDSET

BACKGROUND OF THE INVENTION

The present invention relates to the user interface of a handset. In particular, it relates to the control of the operation of a display of such a device.

The displays of handportable devices, such as radio communication devices present severe constraints on the amount of information that can usefully be presented to the user at any one time. These constraints have become increasingly problematic as users demand ever more information at their fingertips.

SUMMARY OF THE INVENTION

According to one aspect of the present invention, there is provided a handset comprising a user interface comprising an input, a display for presenting an item, and selection means coupled to the input for selecting an item presented on the display; means for defining a first boundary in a first display direction; means for defining a second boundary in a further display direction; means for providing a contracted version of an item which fits within the first and second boundaries; and means for providing a corresponding expanded version of the item which fits within the first boundary and expands in the further display direction; control means, coupled to the selection means, expanded version provision means and contracted version provision means, for controlling operation of the display to present the contracted or expanded version of the item; wherein when the contracted version of the item is presented on the display and selected by the selection means, the control means controls the operation of the display to present the corresponding expanded version.

Such a radio handset has improved user operability for a number of reasons. For example, the user can obtain an overview of options available to him, typically on a single display page, with further detail available to him if so desired. After a period, the user may familiarise himself with the contracted version of an item and thus no longer refer to the expanded version. Hence, the speed with which the user can select the appropriate options can be improved. In any event, improved flexibility of manipulation of the information by the user is provided.

One particular benefit for both users and phone manufacturers is the fact that consistent user interface styles can be used irrespective of the amount of information an item contains. This is particularly advantageous regarding the introduction of browser phones, which inherently deal with large amounts of information, as a user familiar with the menu structure of a manufacturer's radiotelephone will not need to learn a new structure in order to operate that manufacturer's browser device.

The first boundary may be in the direction of the width of the display. In this case, the boundary may be defined by the active width of the display, for example. Alternatively, the boundary may only cover part of the width, so that, for example, two horizontally aligned contracted versions may be expanded depthwise on the same display page.

Preferably the second boundary is defined by the depth of a display line, so that a number of options can be presented on different display lines. The display line may be a predefined area for text.

Alternatively, the first boundary may be in the direction of the depth of the display. In this case, the boundary may be defined by the active depth of the display, for example. Alternatively, the boundary may only cover part of the depth, so that, for example, two vertically aligned contracted versions may be expanded widthwise on the same display page.

The contracted version of the item may be a reduced content version. For example, on the one hand, text may be abbreviated or truncated. It is useful for the user if he is presented with an indicator that the version is contracted. For example, if text has been truncated, three dots at the end would provide a suitable indicator. On the other hand, an item in the form of an icon may be reduced to a textual version. This has the advantage of improving the speed with which the options can be presented as lass processing is required to operate the display.

Instead, the contracted version of the item may be a reduced size version. For example, it may have a reduced font size.

The input may comprise means for identifying an item to be selected by the selection means. This may take any of a number of forms, including voice recognition means and key means.

In one embodiment, the item may be numbered or lettered, and the item to be selected identified by the actuation of a key with the corresponding number or letter.

In one embodiment, the item identifying means further comprises a cursor controlled by the key means. The cursor would typically take the form of a line or highlighter. In this event, the selection means may select the item identified by the cursor, in accordance with a further key stroke. Alternatively, however, it may select an item if that item is identified by the cursor for a predetermined period.

Once the expanded version has been displayed on the display, the control means may be arranged to either cause the display to represent the contracted version after a given period, or only return to that display page in response to a key stroke.

Preferably, the key means comprises navigation means, as this improves the speed of the users movement through his desired route. The navigation means may, for example, be a a scroll key, such as a roller key or a key having depression elements for scrolling in associated directions.

The item to be presented may be an item stored in the device, such as an entry in a phonebook. However, the invention is particularly suited to devices such as browser phones which comprise a radio receiver for receiving a high information content item to be presented on the display from a remote server. It is also particularly advantageous when dealing with selection lists.

When a contracted version of an item is selected, the display may be operated to totally replace that version with the expanded version. Instead, however, both versions may appear on the display together.

BRIEF DESCRIPTION OF THE DRAWINGS

Embodiments of the present invention will now be described, by way of example, with reference to the accompanying drawings, of which:

FIG. 5(a) illustrates how information may be presented on a large display, such as a desktop PC monitor, FIG. 5(b) illustrates the information shown in FIG. 5(a) as a list;

FIGS. 7 and 8 illustrate examples of wireless markup language (WML), which a radio handset of the invention may receive from a network, for example, and a preferred resultant user interface;

FIG. 11 shows how the display of the device of FIG. 1 may be divided into regions for displaying different types of information;

FIG. 14 shows another example of the invention in practice.

DETAILED DESCRIPTION OF THE INVENTION

Figure 1:
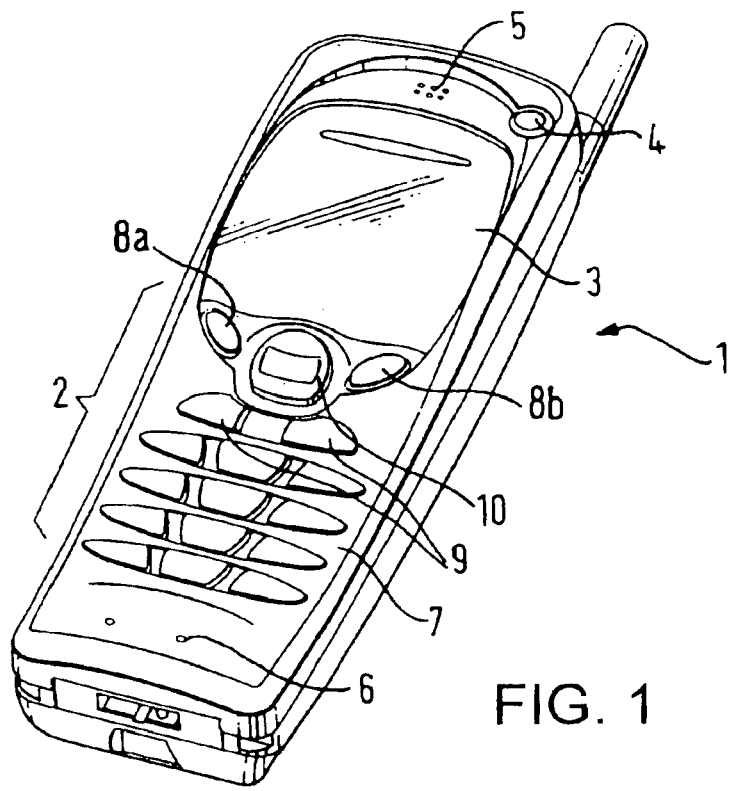
FIG. 1 illustrates a radio handset according to an embodiment of the present invention.

FIG. 1 shows a preferred embodiment of a radio handset, according to the present invention. The handset, which is generally designated by 1, comprises a user interface having a keypad 2, a display 3, an on/off button 4, a speaker 5, and a microphone 6. The handset 1 according to the preferred embodiment is adapted for communication via a wireless telecommunication network, e.g. a cellular network. However, the handset could also have been designed for the cordless network. The keypad 2 has a first group 7 of keys, such as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing. The keypad 2 additionally comprises two soft keys 8a and 8b, two call handling keys 9, and a navigation key 10.

The two soft keys 8a and 8b have functionality corresponding to what is known from the handsets Nokia 2110™, Nokia 8110™. The functionality of the soft keys depends on the state of the handset and the navigation in the menu by using navigation key 10. The present functionality of the soft keys 8a and 8b is shown in separate fields in the display 3 just above the keys 8a and 8b.

The two call handling keys 9 according to the preferred embodiment are used for establishing a call or a conference call, terminating a call or rejecting an incoming call.

The navigation key 10 is an up/down key and is placed centrally on the front surface of the handset between the display 3 and the group of alphanumeric keys 7. Hereby the user will be able to control this key by simply pressing the up/down key using his/her thumb. Since many experienced handset users are used to one-hand control, it is a very good solution to place an input key, requiring precise motor movements. Thus, the user may place the handset in the hand between the finger tips and the palm of the hand. Hereby, the thumb is free for inputting information.

Figure 3:
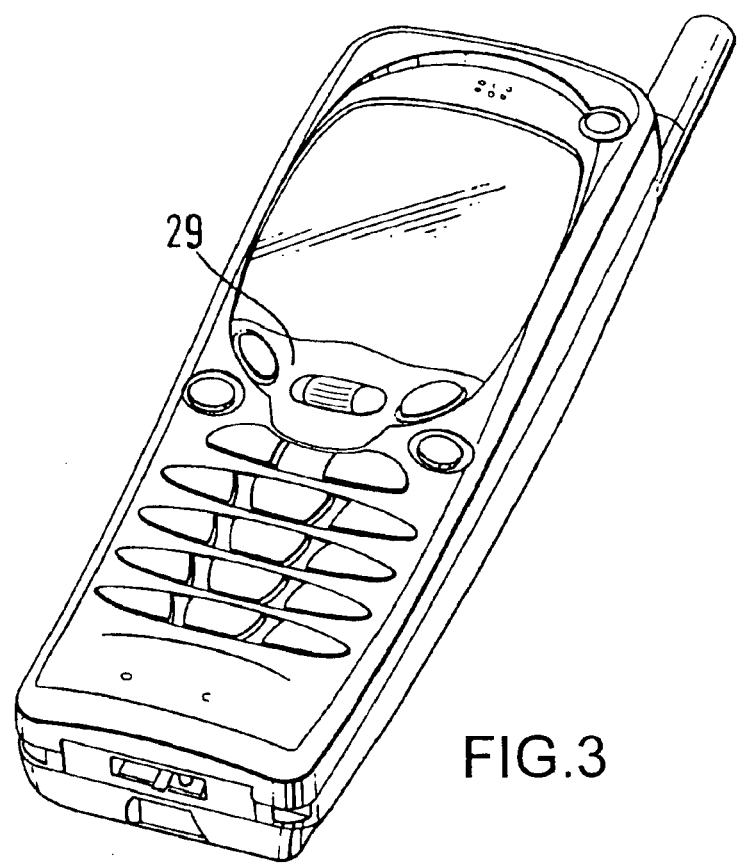
FIGS. 3 and 4 illustrate alternative handsets to that shown in FIG. 1.
Figure 4:
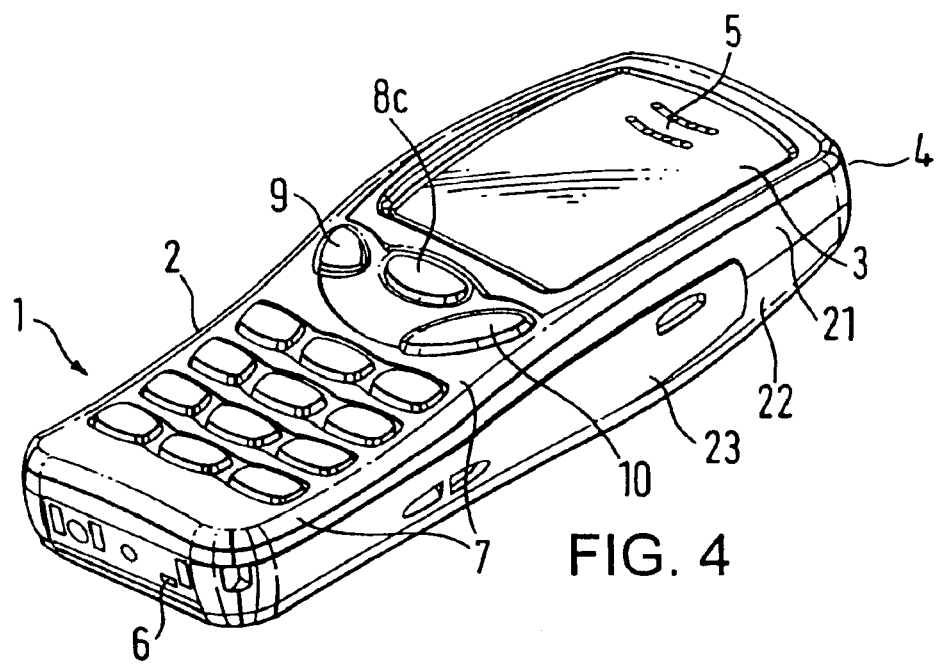

FIGS. 3 and 4 illustrate alternative handsets to that in FIG. 1. The handset of FIG. 3 differs in that the navigation key is a roller key. The roller key can be rolled for navigation and pressed for selection, and assists speedy movement through display pages. The handset of FIG. 4 differs in that is has a single soft key 8c and a single call handling key 9. The single soft key operates as in the Nokia 3110™.

Figure 2:
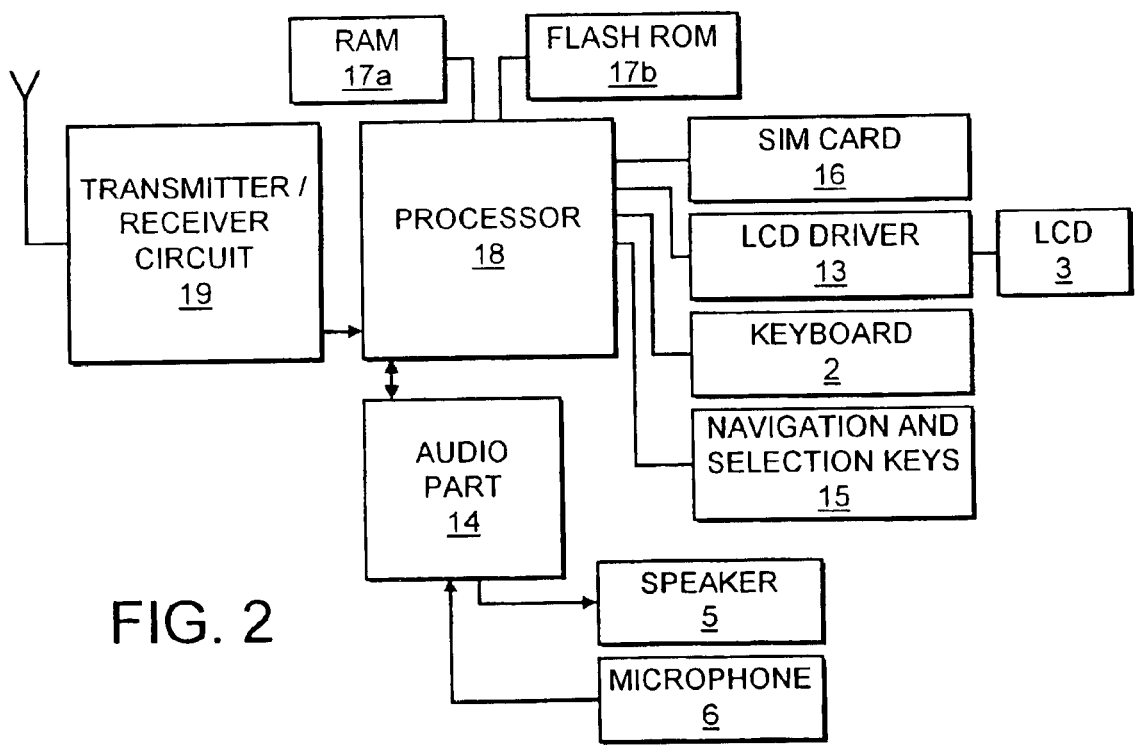
FIG. 2 illustrates parts of the radio handset of FIG. 1.

FIG. 2 is a block diagram of the most important parts of a preferred embodiment of the handset, these parts being essential to understand the invention. The preferred embodiment of the handset of the invention is adapted for use in connection with a GSM network, but, or course, the invention may also be applied in connection with other handset networks, such as other kinds of cellular networks and various forms of cordless handset systems or in dual band handsets accessing sets of these systems/networks. The microphone 6 receives the user's speech, and the analogue signals formed thereby are A/D converted in an A/D converter (not shown) before the speech is encoded in an audio part 14. The encoded speech signal is transferred to control means 18. The control means 18 comprises a processor, which may support software in the handset. The control means 18 also forms the interface to the peripheral units of the apparatus, wherein the peripheral units can comprise a RAM memory 17a and a Flash ROM memory 17b, a SIM card 16, and display 3 and the keypad 2 (as well as data, power supply, etc.). The control means 18 communicates with a transmitter/receiver means 19, e.g. a circuit which is adapted to send/receive a request/response to/from a telecommunication network. The audio part 14 speech-decodes the received signals, which are transferred from the control means 18 to the earpiece 5 via a D/A converter (not shown).

The control means 18 is connected to the user interface. Thus, it is the control means 18 which monitors the activity in the handset and controls the display 3 in response thereto. Therefore, it is the control means 18 which detects the occurrence of a state change event and changes the state of the handset and thus the display text. A state change event may be caused by the user when he activates the keypad including the navigation key 10, and these type of events are called entry events or user events. However, the network communicating with the handset may also cause a state change event. This type of event and other events beyond the user's control are called non user events. Non user events comprise status change during call set-up, change in battery voltage, change in antenna conditions, message on reception of SMS, etc.

FIG. 5 illustrates the menu of a curry house. This menu could have been stored in memory 17a of the handset by the user (for example in the format shown in FIG. 5b). Alternatively, it could be provided by a restaurant as an Internet service. A typical Internet service might have a page looking like FIG. 5a on a conventional desktop PC monitor.

The format shown in FIG. 5b is not suitable for a handset display which may typically have six lines for text, as it would require a large amount of scrolling by the user in order for him to see all the options available. Moreover, he would need to scroll through all the options of a certain meal type before arriving at a meal type that he desires. For example, if he only wishes to look at the main course and sundries, he would need to scroll through the set menu type and set menu options and the starters and starter options before reaching the main course options.

Figures 2, 5C:
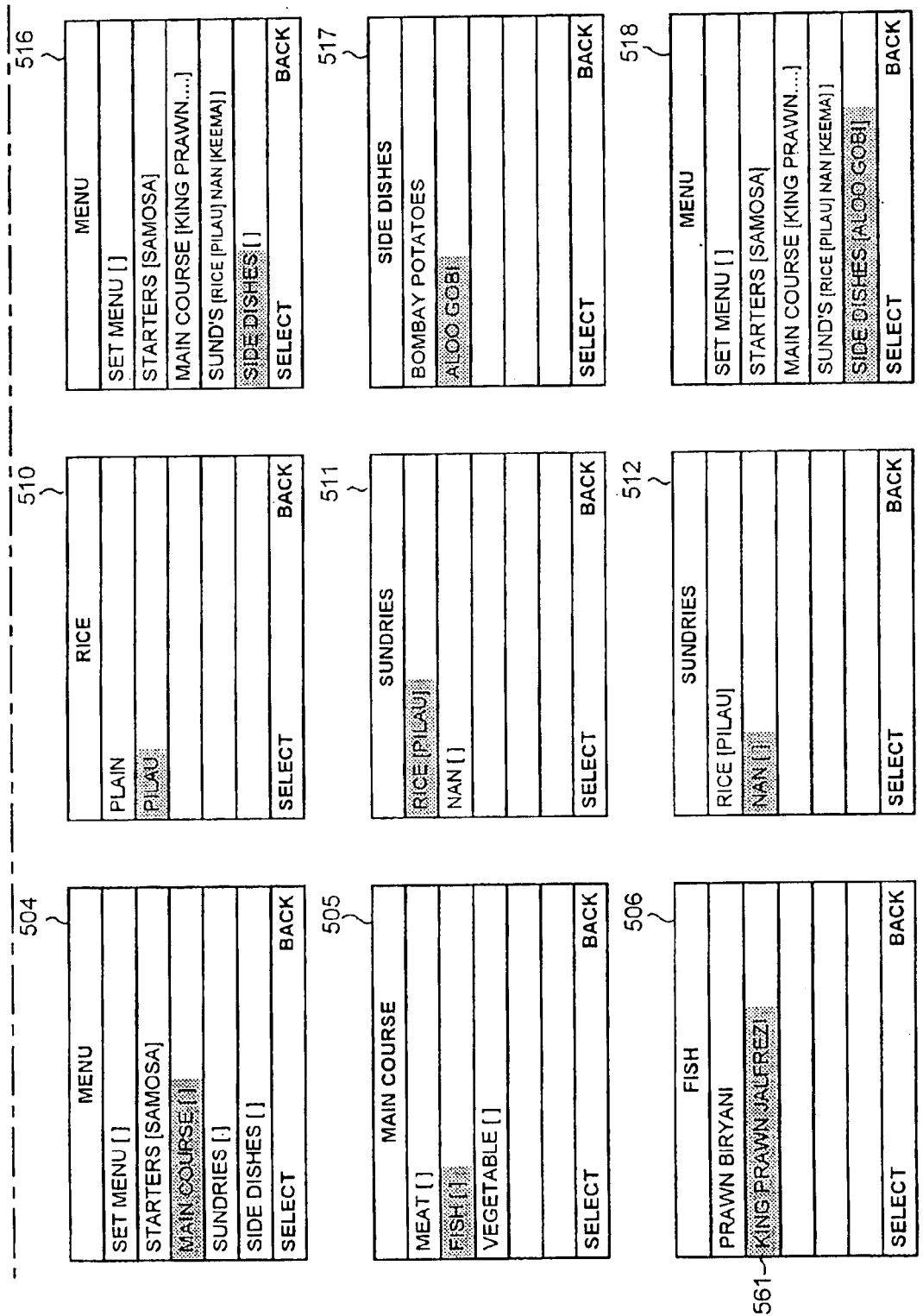
FIG. 5(c) illustrates how the information shown in FIG. 5(a) may be structured for display on a radio handset, according to a preferred embodiment of the present invention.

FIG. 5c, on the other hand, illustrates a preferred display menu arrangement according to an embodiment of the present invention.

The content which may appear on a display can be divided into two types, static items (e.g. plain text) and react-to or reactive items (e.g. input elements, select elements). In FIG. 5a, the static and reactive items are shown together on the display. The headings set menu, starters, main course, sundries and side dishes are static items, and the selection lists under those headings e.g. Samosa, Prawn Puree, Onion Bhaji under the heading starters, are react-to items.

In the embodiment of the invention shown in FIG. 5c, however, rather than display both static and react-to items together, the react-to items are each given a static instance on the display, which links to the corresponding react-to item. For example, static instances can be identified by the user in this embodiment by the presence of square brackets [ ] on the display. Looking at display pages 501 and 502, display page 501 comprises a static instance 521 "starters [ ]" a which links to a starters selection list on the starter page 502. The menu page 501 may be replaced by the starters page 502 when the user selects the "select function" 522 by actuating the corresponding soft key (for example the soft-key 8a of the handset shown in FIG. 1).

As can be seen from FIG. 5c, the user gets to see all the meal types available on the menu on a single display page, without having to scroll through all the selection lists first (display page 501). This has the advantage of him being able to have a clear overview of the possible meal type options and also enables him to skip options not of interest to him (for example the set menu options in this case).

In this embodiment, the user has selected the starters static instance "starters [ ]" 521 by moving the cursor to that option and pressing the select soft key. Hence, the handsets processor 18 causes the display to show a new display page, namely the linked starters page 502. The user then scrolls through the options (for example using navigation key 10 in the handset of FIG. 1) and presses the select soft key when the starter he desires is highlighted. The display then reverts to showing the main menu page, but with an indication of the starter choice selected (display page 503). This may occur automatically upon selection or in response to the user selecting the back function 523 by actuating the associated right soft key 8b.

The user then selects the next meal type he desires: in this case a main course. The static instance "main course [ ]" is highlighted (display page 504) and upon selection, the processor controls the display to show the linked page, namely the main course page 505. In order to enable the user to make a selection quickly and with the minimum amount of scrolling, this main course page 505 displays further static instances corresponding to main courses of certain types, namely meat, fish and vegetables. In this case, the user has highlighted the fish option, thus eliminating the need to plough through the meat and vegetable dishes unless he so desired. In this example, King Prawn Jalfrezi is selected (from display page 506) and the display reverts back to show the menu page 507, now with starter and main course options indicated. Due to the small size of the display, and the number of meal types available, no extra lines are available on this handset display for new text. Hence, as one display line is not long enough for the full text, the term King Prawn Jalfrezi has been truncated on line 562. In order to indicate this to the user, in this embodiment the processor has included three dots in this reduced version. Further explanation of the reduction of the full text is given below, in particular with reference to FIG. 6. Next, the user selects sundries on the main menu page 508, and the display is operated to present the sundries page 509. Like the main course page, the sundries page comprises further static instances rice, [ ], nan [ ] which link to respective rice and nan selection lists (on display pages 510 and 513). The user in this example has selected from both lists (display pages 511 and 512), and the result is shown in the resultant sundries page 514. The display then reverts back to show the main menu page 515. As can be seen from this page, there is again no available display page to show all the sundries choices in full. Hence a reduced version is shown. However, contrary to the reduced version of the main course 562, the text is not truncated this time. Instead, the term sundries has been contracted by an elision and displayed as "sund's" 584, and the rice and nan selections 582 and 583 have been displayed in reduced size font 585.

Next, the user selects his desired side dish in the same manner (via display pages 516 and 517), and his selection is finally complete as shown in the filled in menu page 518. If appropriate, by selecting the back function, the user may be able to go to another page in which he can order his selection over the Internet.

FIG. 6 illustrates different examples of how the terms 561 and 581–583, which are shown in reduced format 562, 584, 585 in FIG. 5c may be shown in their full format.

Figure 6B:
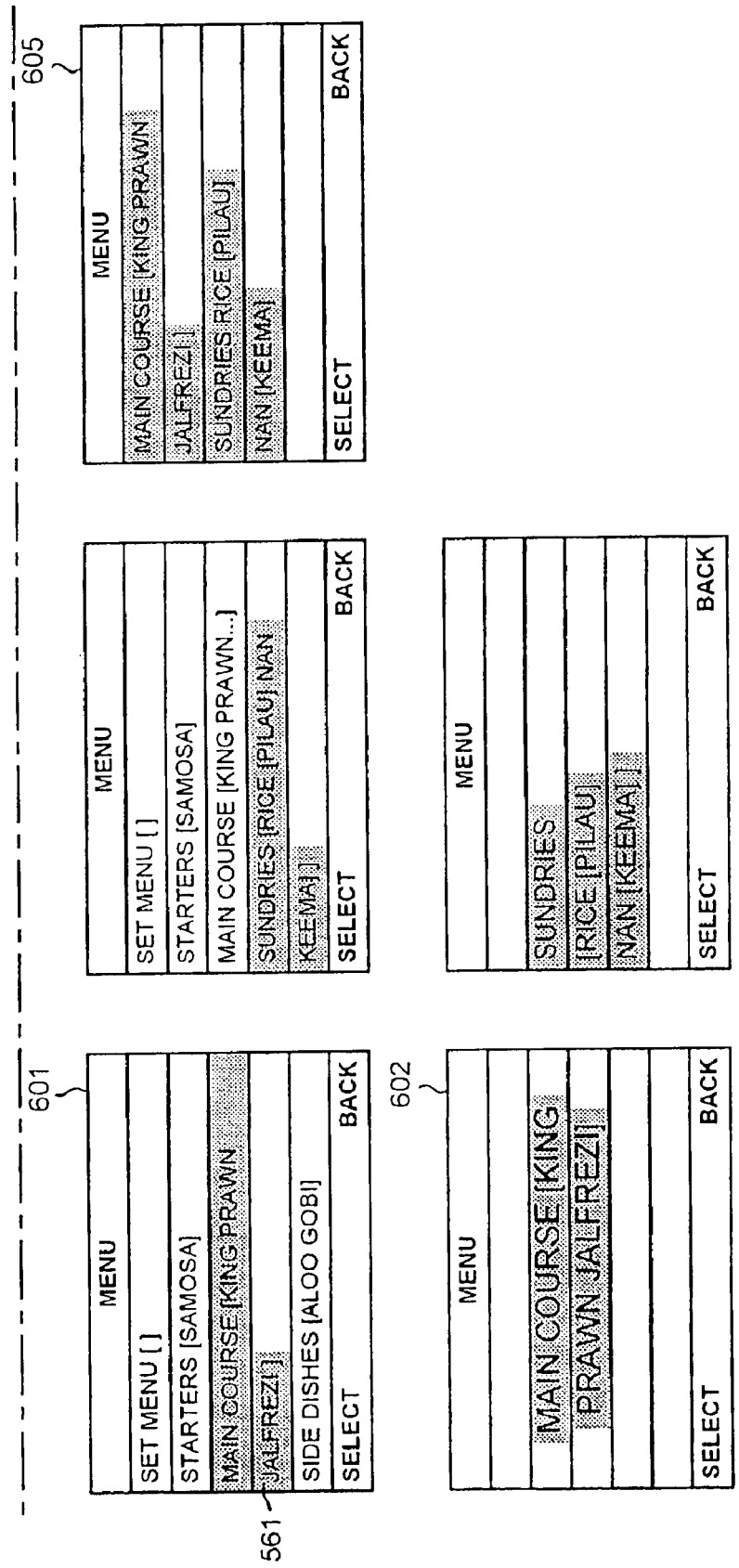
FIG. 6 illustrates how various terms in reduced format may be shown in their full or expanded format according to a preferred embodiment of the present invention.

FIGS. 6a and 6b illustrate how the term main course [King Prawn Jalfrezi] may be shown in full format on the handset display. Firstly, the term is selected by the user, in this case by moving the cursor to the term shown in its reduced format. The processor may control operation of the display so that the full format of the item is shown if the cursor remains on the corresponding reduced format for a period (for example 3.5 seconds) or by the user actuating a specified key (e.g. star or hash). Likewise, the processor may cause the display to show the item in its full format until it receives a further user input, or it may cause the display to revert back to the previous page after a predetermined period.

Display pages 601 and 602 show alternative expanded formats. On display page 601, the expanded format obscures information relating to the sundries, but the other options remain in the view, whereas in display page 602, the previous page 603 is totally replaced by the full text main course [King Prawn Jalfrezi] which has also been increased in font size.

Display pages 610 and 611 illustrate the same alternatives for the expanded format of the sundries selections.

Display page 605 illustrates another example, in which both the main course and sundries reduced format items are selected (display page 604) and their consequential expanded versions are displayed together on display page 605.

FIGS. 7 and 8 show further examples in which the present invention may be employed, FIG. 7 showing react-to items in the form of an input list and FIG. 8 showing react-to items in the form of a selection list.

One way of accessing telecom related information services, such as the Internet, is the use the wireless application protocol (WAP). The wireless application protocol (WAP) is a result of continuing effort to define an industry wide standard for developing applications over wireless communication networks. WAP intends to use wireless mark up language (WML) to specify content and user interface for narrow band devices, including cellular phones and pagers. WML is a mark up language based on extensible mark up language (XML).

All information in WML is organised into a collection of cards and decks. Cards specify one or more units of user interaction. A user navigates through a series of WML cards, reviews and contents of each, enters requested information, makes choices, and moves on to another card. The cards are grouped together into decks. A WML deck is similar to a hypertext mark up language page (HTML) in that it is identified by a URL and is the unit of content transmission.

Hence, the WML shown in FIGS. 7 and 8 are examples of what a radio handset may receive from a radio network.

WML does not specify how the handsets processor is to control operation of its display so as to provide the information transmitted to the user. This is defined by the user agent (for example the radio handset processor). As can be seen from FIG. 7, the WML contains both static and react-to items on the card entitled info. When this WML is received by a handset of the present invention, these terms are separated and linked as appropriate.

For example, the display page 701 comprises static terms including static instances [ ] 711 and 712. These static instances are linked to corresponding react-to items. For example, the static instances 711 relating to the first name is linked to a first name display page 702 in which the user can add his name using the handset's data editor. As in the example of FIG. 6, once the user has edited his name he can select the OK soft key to return to the info page, in which he will be able to view the item input (see display page 703). In other words, the input fields are not embedded to content as in HTML/WWW, but are presented as links [ ].

FIG. 8 illustrates a selection list. It is arranged in a similar manner to that described with reference to FIG. 6, and will thus not be described further here.

Figure 9A:
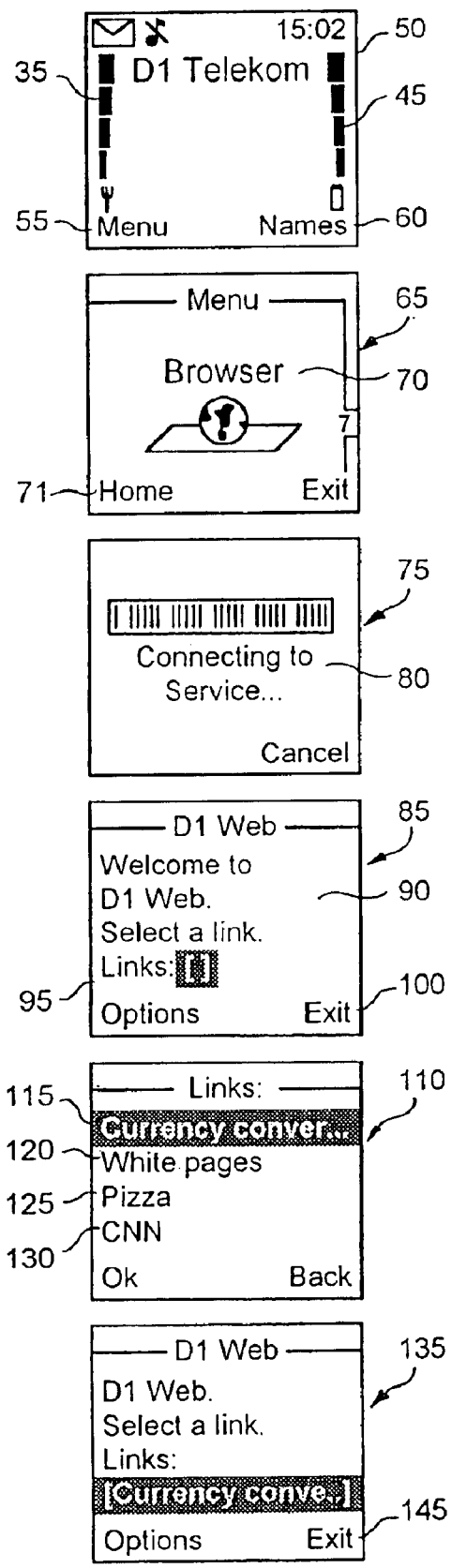
FIGS. 9 and 10 relate to the browser of a radio handset, and exemplify its user interface for different services received from the network.
Figure 9B:
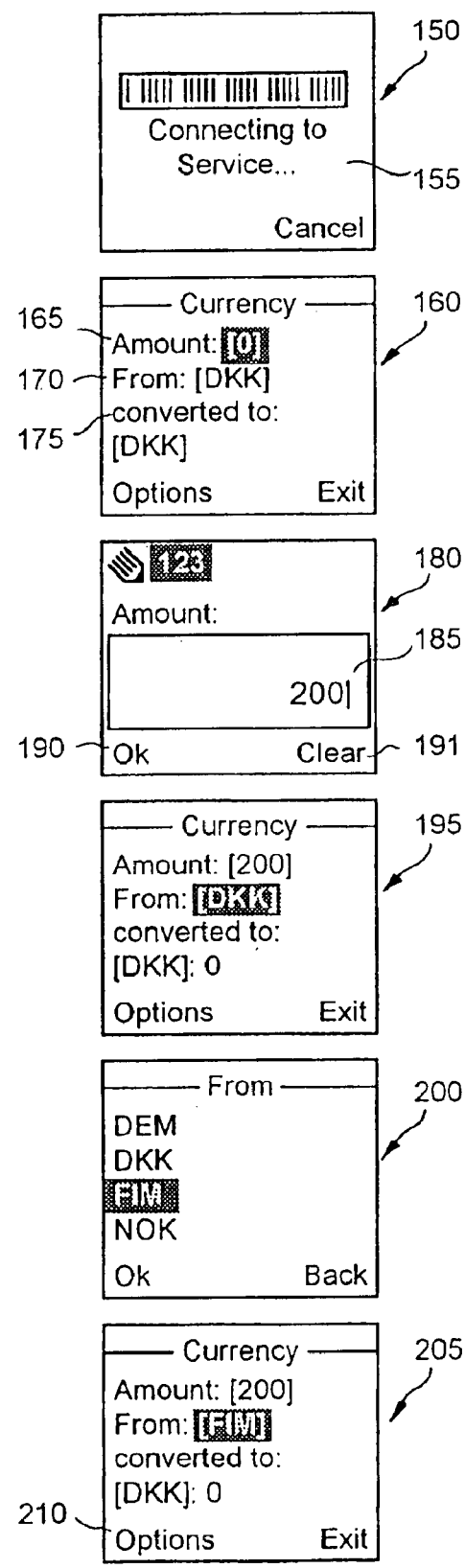
Figure 9C:
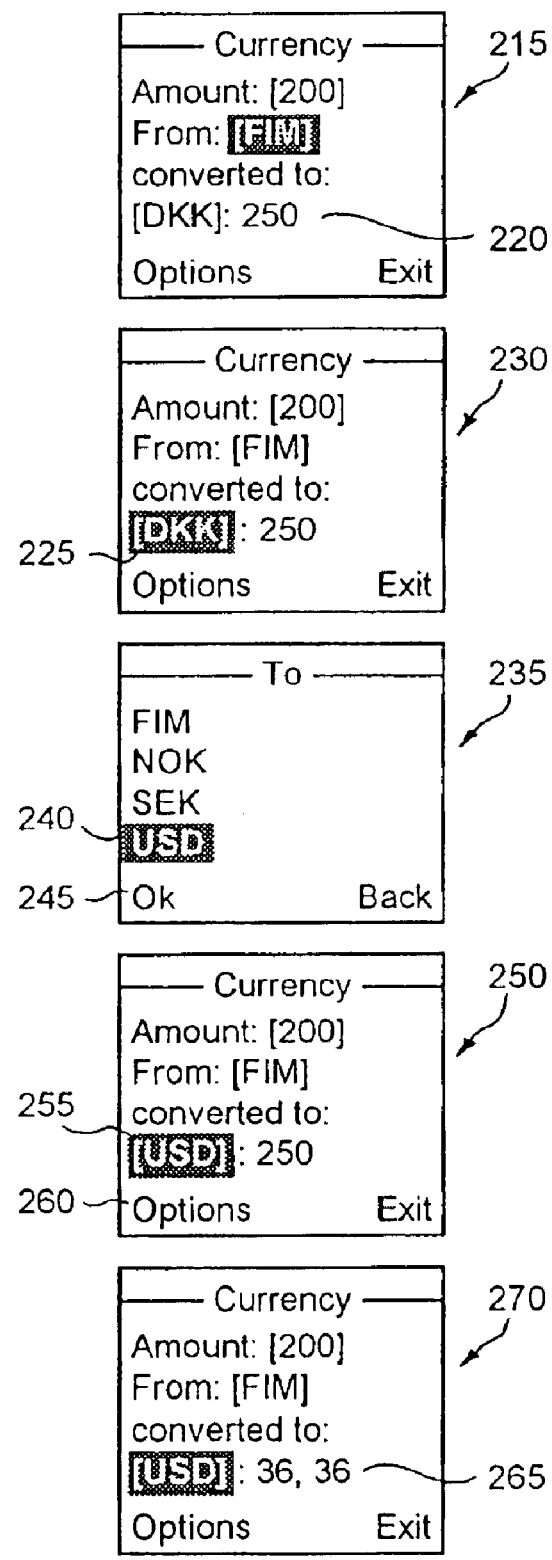
Figure 10A:
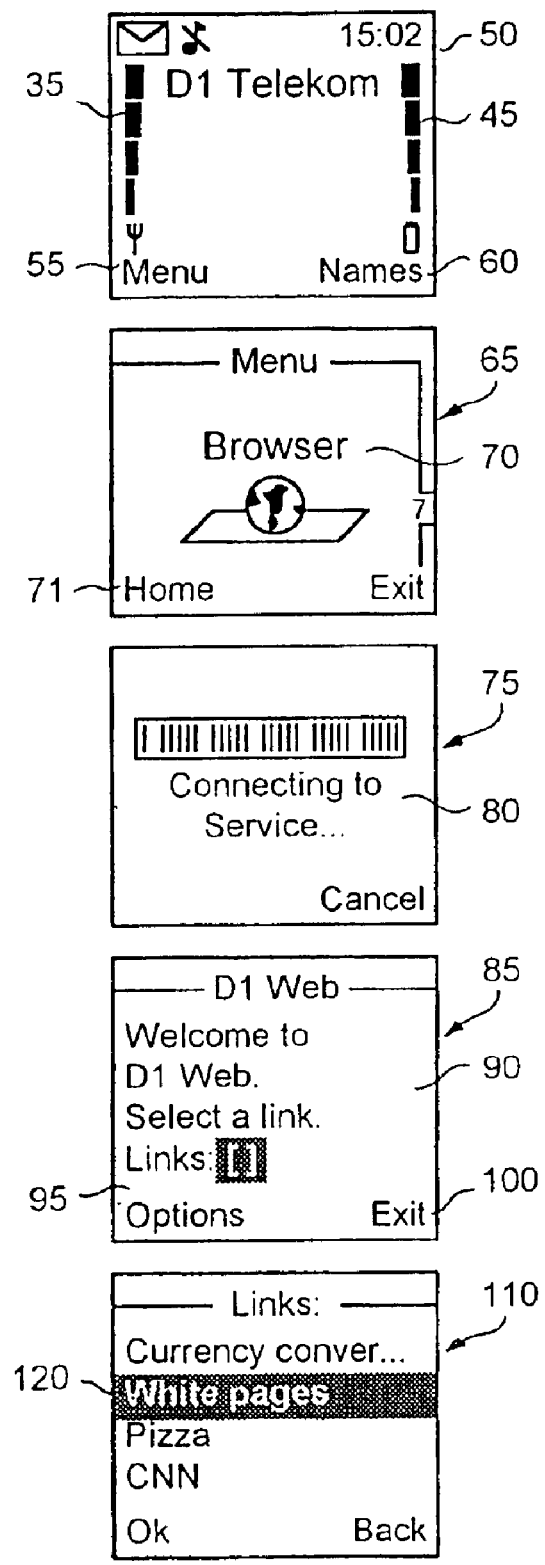
Figure 10B:
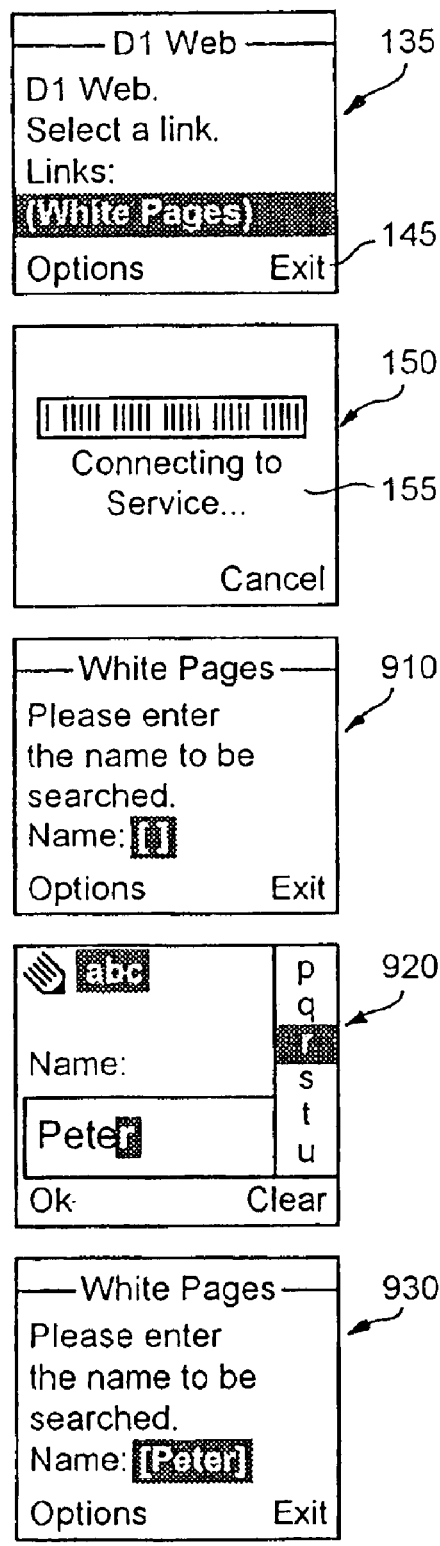
Figure 10C:
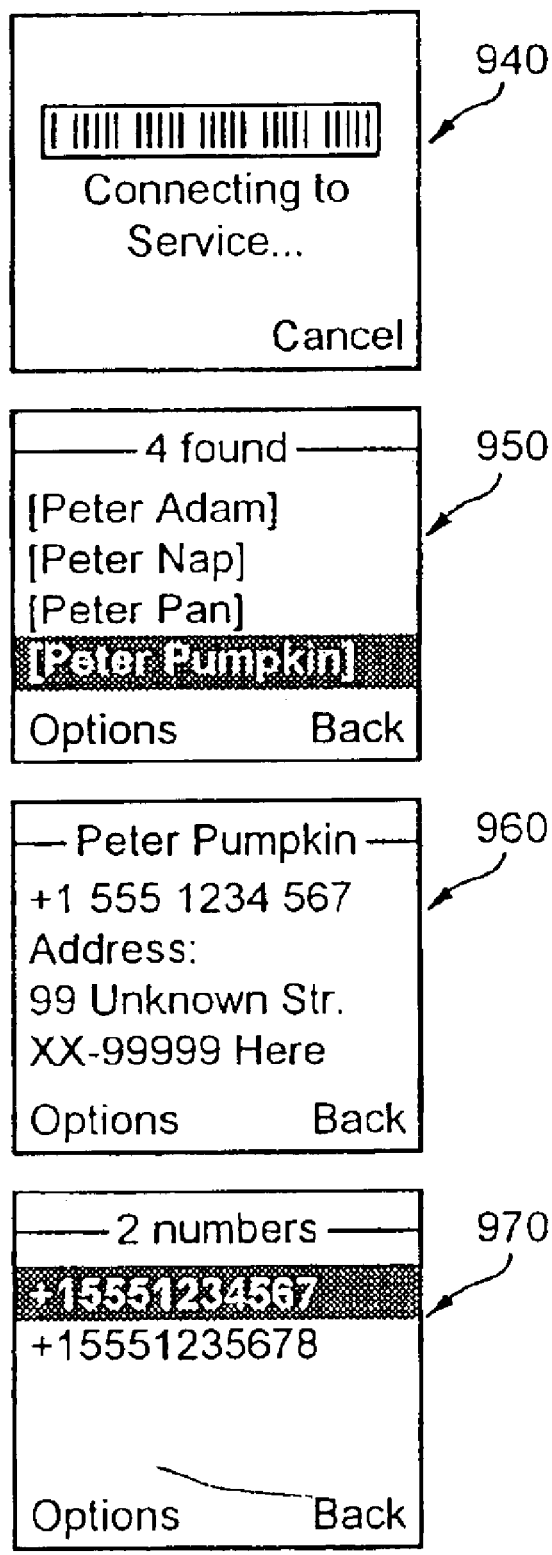

FIGS. 9 and 10 relate to the browser of a radio handset, and exemplify its user interface for currency conversion and white pages services respectively.

Turning first to FIG. 9, the user interface of the handset of this embodiment may comprise the same elements as shown in FIG. 1, i.e. a keypad 2, a display 3, an on/off button 4, a speaker 5 and a microphone 6. Also, the control means 18 in FIG. 2 may control the user interface. A display page 30 is presented on a handset display, as shown in FIGS. 1 and 2, which indicates signal strength 35 from the wireless telecommunication network "D1 Telekom" 40, the battery power 45 and a clock showing the time 50 in hours and minutes. Preferably, the display in the handset is an LCD (Liquid Crystal Display) display. The display can be controlled by the control means 18 as shown in FIG. 2. The layout 30 presents an example of the handset in idle mode, i.e. when the handset is activated and awaiting an action, e.g. an incoming or outgoing call. At the bottom of the display, in specified softkey fields there are two items which are denoted as "Menu" 55 and "Names" 60. If the user selects "Names" 60 he can e.g. access a built in phonebook. If the user selects "Menu" 55, he can select from among several different menus. The actual selection of functions in the softkey fields, like "Menu" and "Names", can be selected by means of the associated soft keys such as those referenced 8a and b in FIG. 1.

One of the menus can be the next page 65 called "Browser" 70. If the user chooses to use this menu, he/she can access different telecom related information services, e.g. Internet, using WAP.

If the user selects "Home" 71, this may lead to the next page 75, which graphically indicates, "Connecting to Service" 80. This shows that the handset is trying to establish a connection to e.g. Internet, by sending an access request to a server. If a connection is established, some kind of welcome text for a home page might be displayed, "Welcome to D1 Web." 90. If the user selects "Options" 100, a list of options can be displayed by the following display page 110. In this example, the different choices are "Currency converter" 115, "White pages" 120, "Pizza" 125, "CNN" 130, etc, and the displayed items are static instances linked to reactive items. As in the FIG. 5 embodiment, the full version "Currency Converter" is longer than the width of the active part of the display. Hence, the reduced version is displayed —a truncated version plus the aforementioned three dot indicator. If selected, the user could see the full text, for example in one of the manners shown in FIG. 6. The user has selected to use the currency converter 115, and browses further to this application in the next page 135. A browser display is shown on this page with the selected item, which is indicated as a link to a service which provides a currency conversion. The user can select to send a request for the chosen item, by selecting the "Options" function 140.

This leads to the next page 150, which is the same as that shown with reference 75, which graphically indicates, "Connecting to Service" 155. If a connection is established, some kind of information text for the currency converter might be displayed. The page is provided with further static instances which link to various editable fields and selection lists. Again, the static instances are shown with square brackets [ ]. The selection which is highlighted can indicate a default state of the selection. The user can input an amount, "Amount: [ ]" 165, in one currency, "From: [DKK]" 170, converted into another currency, "converted to: [DKK]" 175, by linking to the pages showing the react to items (e.g. display pages 180, 200). Thereafter, the user may press Ok 190, or clear the amount by selecting "Clear" 191, to return back to the previous display page.

The steps for choosing a first currency to convert from 170, and choosing a second currency to convert to 175, are repeated in the pages 195–205. Thereafter, the user may select "Options" 210, in page 205, which in this example activates the calculation of the currency conversion and displays the result 220 in the next page 215.

If the user wishes to continue with the currency conversion, and chooses another currency to convert to, the user selects the option "converted to [DKK]:" 225, which becomes highlighted upon selection, and is shown in page 230. In the next page 235, a selection list of available currencies is displayed. The user selects e.g. USD 240, and selects the entry by selecting "Ok" 245. The next page 250 highlights the selected currency USD 255 to convert to. Thereafter, the user may select "Options" 260, which in this example once again activates the calculation of the currency conversion and the result "[USD]: 36, 36" 265 is displayed with the selected information in the next layout 270.

FIG. 10 is an alternative service, but the same handset can be used as in the embodiment of FIG. 9. The first four display pages are the same as for the currency converter and will thus not be described further. When the fifth display page is presented to the user he selects the White Pages option (display page 135). The White Pages application provides a tool to search contact information on a specific person. Once selected, an access request is sent to the server, as indicated on the display page 155. The handset's processor interprets the incoming WML to provide a static instance 911 on the following display page 910. When selected this static instance links to an edit page 920. The user enters the search string, in this case Peter, and the main White Pages display page 930 is returned to, which indicates the search string. Upon instruction, an access request is sent to the server and a corresponding display page 940 is presented on the display. The search results are received by the handset and listed. The user browses to the desired item on page 950 and selects it (e.g. by rolling a roller key and then pressing it down to select it). Details of the person are displayed (pages 960 and 970). Details from these pages can be used in call handling as if they were stored in a conventional handset's phonebook (e.g. save, add to name, send message, call).

FIG. 11 illustrates a multipurpose browser display according to a preferred embodiment of the invention. A multipurpose browser display is a term for a user interface of a WML card. It can contain hotlinks, input elements, selection list items, static text areas and images.

The display has been split into fields, so that information of a certain type will appear in a particular field. For example, information tagged as a header will appear in the field referenced B, and functions relating to the softkeys will appear in respective fields A1 and A2. The table (d) of FIG. 11 defines the size and position of the fields on the display. This information is preferably stored in the handset and accessed by the processor when controlling operation of the display. The column headers refer to the following:

| | |
|---|---|
| left column | a letter which connects a window on the display picture and a row in the property table |
| Name | name of the window |
| X | horizontal co-ordinate of the left top corner pixel |
| Y | vertical co-ordinate of the left top corner pixel |
| W | horizontal width of the window in pixel amount |
| H | vertical height of the window in pixel amount |
| LM | left margin in pixel amount (0 = no marginal) |
| RM | right margin in pixel amount (0 = no marginal) |
| TM | top margin in pixel amount (0 = no marginal) |
| BM | bottom margin in pixel amount (0 = no marginal) |
| J | justification in the window (R = Right, L = Left, C = Centered) |
| Contents | information of the contents of the window |

There may be several different combinations of subdivisions. Two such examples are shown in FIG. 11(b) and 11(c). FIG. 11(b) is a useful arrangement for static instance lists and selection lists, and FIG. 11(c) is useful for editing (e.g. input elements) and also for images. As will be appreciated, the fields for selection lists are only one display width long. Hence, it is expected that reduced versions of items will often appear in the fields C to F in particular.

Figure 12A:
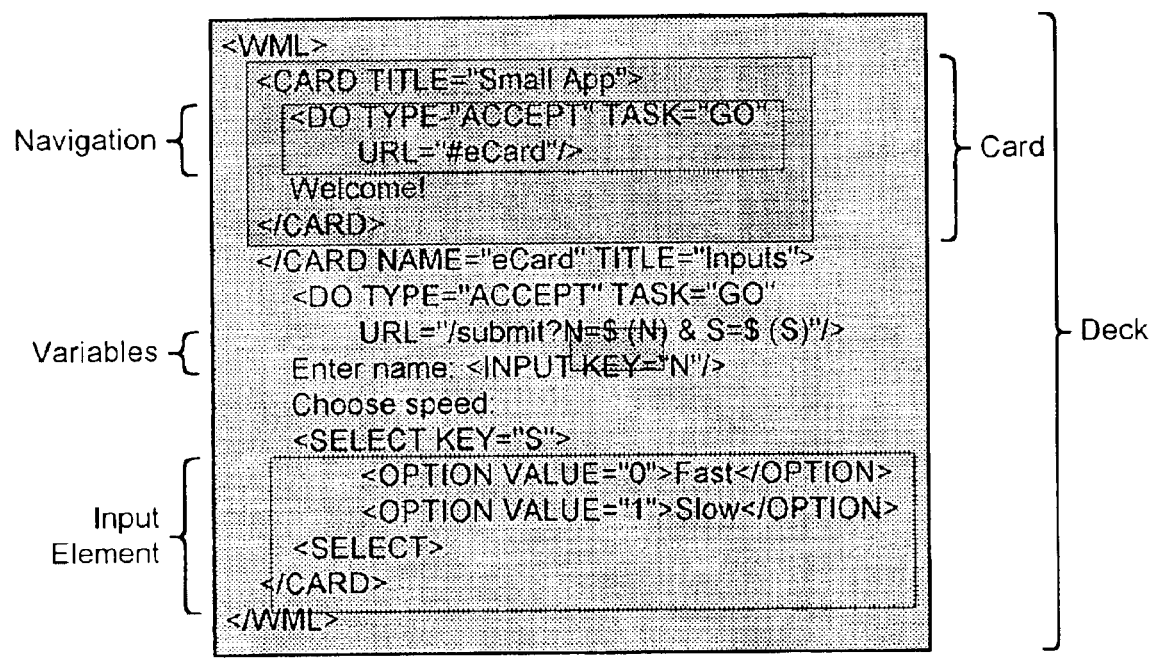
FIG. 12(a) illustrates WML received by a radio handset from the network.

These fields have been used in the FIG. 12 embodiment, which will now be described. FIG. 12 illustrates some incoming WML, the resultant user interface according to the invention, and how a handset interpreted the WML to arrive at the desired user interface.

The WML defines a deck of two cards. The first card has the title "Small App" and displays the static text "Welcome!" That card also defines a function that upon an "accept signal", another card should be gone to, in this case the card named "eCard". The eCard has a title "Inputs" and has both an input function (Enter name) and a selection function (Choose speed —fast or slow). This information is transmitted to all handsets on a network. However, how that information is presented to a user is dependent upon the user agent (e.g. browser) of the handset, which interprets the WML. The static and reactive items are separated and linked by [ ].

The display is set such that the items tagged as "titles" appear in the header field B of the display, the listed items each appear in the single line fields C, D, E F, and the user input field appears in the field identified as G in FIG. 11(c). The first card is displayed on a first page, as referenced 120 in FIG. 12b. This page contains the title Small Apps 131 appearing in the header field, and the static text Welcome! It also contains the functions of the softkeys, options and back.

The processor is arranged to move to the next card in response to the actuation of the option softkey. However, rather than display all the content of the next card in a continuous string, the processor controls the display to present page 121 which bears only static instances 132 corresponding to the two functions enter name and choose speed. These link to further display pages 122 and 123 respectively which enable the name to be input and speed chosen. Since the whole of the second WML card is unlikely to fit on a single display page, the interpretation given by the browser in this embodiment avoids the need for scrolling, and provides a clearer overall picture of the information required.

Figure 12B:
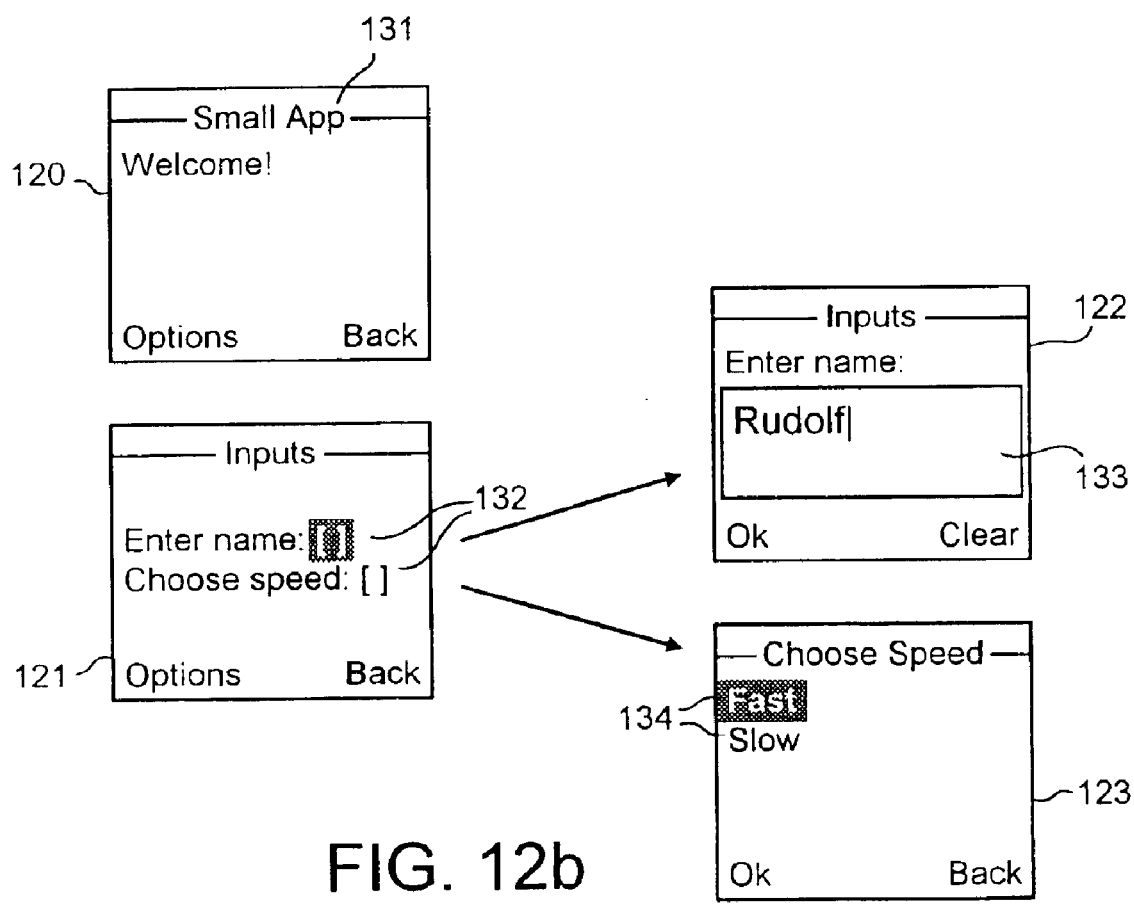
FIG. 12(b) illustrates a preferred resultant user interface.
Figure 12C:
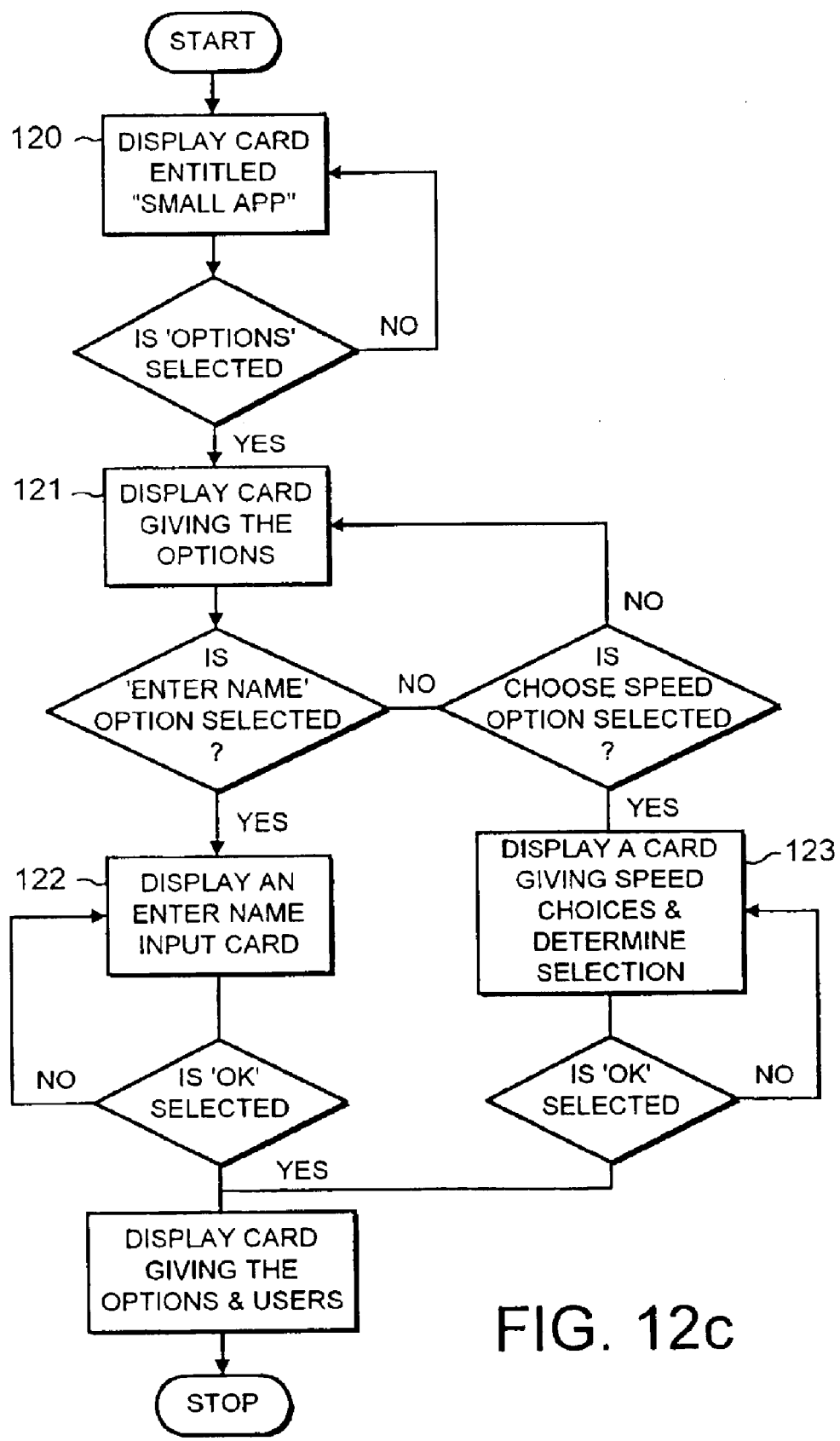
FIG. 12(c) is a flow diagram illustrating the interpretation of the received WML shown in FIG. 12(a) by the radio handset, to arrive at the user interface of FIG. 12(b)

FIG. 12(c) is a flow chart showing the interpretation of the WML to arrive at the display pages shown in FIG. 12(b) and how navigation through the pages takes place.

Figure 13:
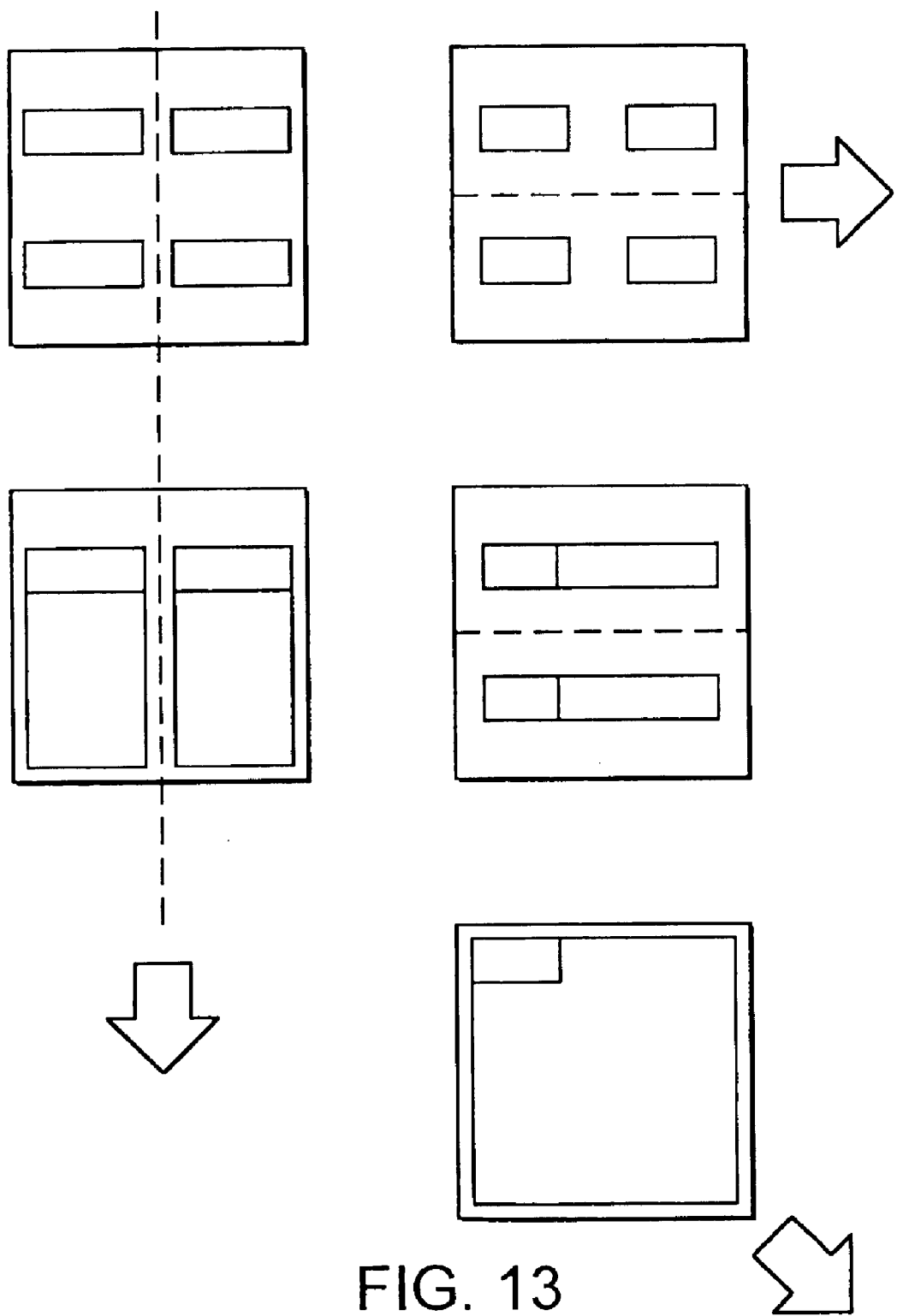
FIG. 13 illustrates different display layouts with reduced versions of items and how they could be expanded.

FIG. 13 shows reduced formats of items on a display, an how they can be restrained within the display width or depth and how the expanded versions can also be restrained within that width or depth.

FIG. 14 gives another example menu with a number of single line choices in reduced format.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

For example, in stead of highlighting options, they could be marked, for example, with a cross.

What is claimed is:

1. A handset comprising:
    an input device;
    display means for displaying a plurality of items;
    selection means for selecting one item from a plurality of items displayed on the display means; and
    control means responsive to the selection means selecting one item from a plurality of first items displayed on the display means, to cause the display means to display a plurality of second items related to the selected first item, wherein:
    the control means is further responsive to the selection means selecting one item from the plurality of second items displayed on the display means, to cause the display means to display the plurality of first items together with an indication of the selected second item.

2. A handset as claimed in claim 1, wherein the display of the indication of the selected second hem is truncated.

3. A handset as claimed in claim 1, wherein the input means comprises means for identifying an item to be selected by the selection means.

4. A handset as claimed in claim 3, wherein the item identifying means comprises voice recognition means.

5. A handset as claimed in claim 3, wherein the item identifying means comprises key means.

6. A handset as claimed in claim 5, wherein the item identifying means further comprises a cursor controlled by the key means.

7. A handset as claimed in claim 6, wherein the selection means selects an item identified by the cursor in accordance with a key stroke.

8. A handset as claimed in claim 6, wherein the selection means selects an item identified by the cursor for a predetermined period.

9. A handset as claimed in claim 5, wherein the key means includes navigation means.

10. A handset as claimed in claim 9, wherein the navigation means comprises a scroll key.

11. A handset as claimed in claim 1, wherein the item to be presented is a user defined item, and the handset further comprises means for storing the user defined item.

12. A handset as claimed in claim 1, further comprising a radio receiver for receiving an item to be presented on the display.

* * * * *